United States Patent
McMahon

[11] Patent Number: 6,128,891
[45] Date of Patent: Oct. 10, 2000

[54] PROTECTIVE HORSE MASK

[76] Inventor: Robin L. McMahon, 1203 Salzer Valley Rd., Centralia, Wash. 98531

[21] Appl. No.: 09/309,002

[22] Filed: May 10, 1999

[51] Int. Cl.[7] ........................................................ B68C 5/00
[52] U.S. Cl. ............................ 54/80.1; 119/850; 54/80.2; 54/80.3; 54/80.5
[58] Field of Search .............................. 119/850; 54/80.1, 54/80.2, 80.3, 80.5

[56] References Cited

U.S. PATENT DOCUMENTS

| | | | |
|---|---|---|---|
| 284,445 | 9/1883 | Lee | 54/80.5 |
| 382,668 | 5/1888 | Sullivan et al. | |
| 449,485 | 3/1891 | Long | |
| 481,152 | 8/1892 | Steele | 54/80.3 |
| 584,947 | 6/1897 | Lundborg | 54/80.3 |
| 2,407,029 | 9/1946 | Miller | |
| 3,104,508 | 9/1963 | O'Hare | 119/850 |
| 3,753,334 | 8/1973 | Blessing | 54/80.2 |
| 3,778,966 | 12/1973 | Hadley | 54/80.5 |
| 3,964,241 | 6/1976 | Allen et al. | |
| 4,178,742 | 12/1979 | Longfellow | 54/80.2 |
| 4,355,600 | 10/1982 | Zielinski | |
| 4,404,789 | 9/1983 | Denning | |
| 4,480,429 | 11/1984 | Knox | |
| 4,581,877 | 4/1986 | Wilber | |
| 4,662,156 | 5/1987 | Oettel | |
| 4,756,145 | 7/1988 | Pelling | 54/80.2 |
| 5,163,272 | 11/1992 | Finley et al. | 54/80.1 |
| 5,341,627 | 8/1994 | Eby | 54/80.2 |
| 5,345,751 | 9/1994 | Edwards | |
| 5,440,864 | 8/1995 | Green | |
| 5,540,189 | 7/1996 | Masson | 119/850 |
| 5,732,415 | 3/1998 | Boyd | 54/85.5 |

OTHER PUBLICATIONS

"Farnam EarGuard™," "Farnam SuperMask™," "Absorbine UltraShield Fly Bonnet," "Eye & Ear Fly Protector," and "Cashel/Robin G. Fleece–Trimmed Flymask," *State Line Tack® Annual Discount Catalog*, 1997, p. 107.

"Robin G Fly Mask and Comfort Ear™," *Practical Horseman*, Mar. 1997, p. 12.
"Horse Mask™ and Comfort Ear™," Robin G Inc., no date provided.
"Ear/Eye Net," "Full Hood Fly Mask," "Short Hood Fly Mask," "Super Eye Mask," "Cashel/Robin G Eye Mask," "Cashel/Robin G Earnet," and "Fly Wraps," *The Source: Dover Saddlery Annual Catalog*, 1996, p. 102.
"Robin G Fly Mask: Worth the Price," *Horse Journal*, May 1998, 3 pgs.

(List continued on next page.)

*Primary Examiner*—Michael J. Carone
*Assistant Examiner*—Daniel J. Beitey
*Attorney, Agent, or Firm*—Christensen O'Connor Johnson Kindness

[57] ABSTRACT

A protective mask for a horse has a cap shaped to conform to a top region of a horse's head. Two sleeves are formed integral to the cap to receive the ears of the horse. An opening is provided in the cap between the sleeves to allow a forelock of the horse to extend therethrough. Alternatively, the cap has three openings spaced laterally across an upper region of the cap to allow the ears and forelock of the horse to extend therethrough. A mesh face panel is coupled to a bottom edge of the cap and extends downward to substantially cover the eyes of the horse. A nosepiece is coupled to a bottom edge of the face panel, and extends laterally to span a bridge of the horse's nose. A seal formed of fleece material is provided on an inner surface of the nosepiece to rest on the bridge of the horse's nose to substantially prevent insects from passing under the nosepiece. A nose panel, preferably made of mesh material, is coupled to a bottom edge of the nosepiece and extends downward to a point adjacent the nostrils of the horse. A plurality of fringe are coupled to the inner surface of the nosepiece and extend downward under the nose panel along the bridge of the horse's nose, stopping short of the horse's nostrils. The fringe serve to further prevent flies and other insects from landing on the horse's nose and from passing under the nosepiece. Straps coupled to opposite edges of the face panel are releasably securable together under the horse's head.

18 Claims, 6 Drawing Sheets

OTHER PUBLICATIONS

"Fabriteck Fly Screen," *Internet Horse Catalog*, http://gprix.com/flyst1.htm, Apr. 22, 1998.

"Papenhausen's Horse Cover–ups," Manufactured by Holcomb, no date.

"Kensington," Custom Made Saddlery Inc., no date.

"Proven Fly Hood" by Hoye Industries, advertised in *Western Horseman*, Aug. 1985, p. 118.

"Face Nets" and "Ear Nets" sold by No–Fly–Net, Inc., advertised in *Equus*, Jun. 1983, p. 34.

"Shoo Fly" manufactured by Heart Manufacturing Co., *Western Horseman*, Jul. 1982, pp. 58 and 106.

"Halterless Fly Bonnet," *Equus*, Jul. 1981, p. 34.

"Absorbine Fly Bonnet" as sold by Western Mass, Equine Sales, Springfield, MA and advertised in *Equus*, Aug. 1980, p. 68.

"Fly Bonnet" by Equi–Care and advertised in *Equus*, Aug. 1978, p. 10.

PROTECTIVE HORSE MASK

FIELD OF THE INVENTION

This invention relates to a protective mask for use on horses.

BACKGROUND OF THE INVENTION

It is desirable to protect a horse from different types of irritation, for example, insects and the sun. More particularly, without the use of chemicals or some type of mask, horses are constantly bothered by flies around the face, eyes, and muzzle. In addition to being an irritation, flies carry disease, such that eye infections in horses are quite common. Also, several types of horses, for example, light-skinned horses or horses with bald faces or a white-haired stripe, also referred to as a blaze, are prone to sunburn. The damage from sunburn may be sufficiently great to cause the horse's skin to blister, peel, and crack to the point of bleeding. Although various medicinal treatments and masks have been developed to alleviate these problems, it is believed that it is possible to develop an improved protective mask. The present invention fulfills this need, and provides further related advantages.

SUMMARY OF THE INVENTION

Briefly, the present invention provides an improved protective mask for use on a horse. In a preferred embodiment, a protective mask is provided with a cap shaped to conform to a top region of a horse's head. Coupled to the cap are a first and second sleeve spaced laterally from each other, each sleeve being formed to receive one ear of a horse. An opening is provided in the cap between the first and second sleeves to allow a forelock of a horse to extend therethrough and rest on an outer surface of the cap. Alternatively, the cap has three openings spaced laterally across an upper region of the cap. The first opening is formed to allow a first ear of a horse to extend therethrough, the second opening is formed to allow the forelock to pass therethrough, and the third opening is formed to allow the second ear of the horse to extend therethrough.

A face panel preferably made of a mesh material is coupled to a bottom edge of the cap and extends downward to substantially cover the eyes of the horse. A nosepiece is coupled to a bottom edge of the face panel, and extends laterally to span a bridge of the horse's nose. A seal provided on an inner surface of the nosepiece rests on the bridge of the horse's nose to substantially prevent insects from passing under the nosepiece. Insects are thereby substantially prevented from entering or irritating the eyes of the horse. Although a variety of materials may be used, in a preferred embodiment, the seal is achieved by coupling a quantity of fleece material to an inner surface of the nosepiece. In a preferred embodiment, a nose panel, preferably made of a mesh material, is coupled to a bottom edge of the nosepiece and extends downward to a point adjacent the nostrils of the horse. To increase the comfort of the horse, fleece material is coupled to an inner surface of the face panel and of the nose panel extending along all edges of the face panel and nose panel which in use, are in contact with the horse. In a preferred embodiment, fleece material is also provided along all other inner seams and edges of the mask that will contact the horse when the mask is positioned on a horse's head.

In a preferred embodiment, a plurality of fringe are coupled to the inner surface of the nosepiece and have a sufficient length to extend downward along the bridge of the horse's nose, stopping short of the horse's nostrils. The fringe serve to further prevent flies and other insects from passing under the nosepiece. Also, movement of the fringe caused by movement of the horse's head will help to prevent flies from landing on the horse's nose.

In a preferred embodiment, straps are coupled to opposite, outer edges of the face panel and nosepiece, the straps being releasably secured together under the horse's head. Although a variety of connectors may be used, in a preferred embodiment, the straps are releasably secured together with Velcro®. The straps may either be formed integral to the face panel, or may be separate pieces sewn or otherwise joined to the face panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
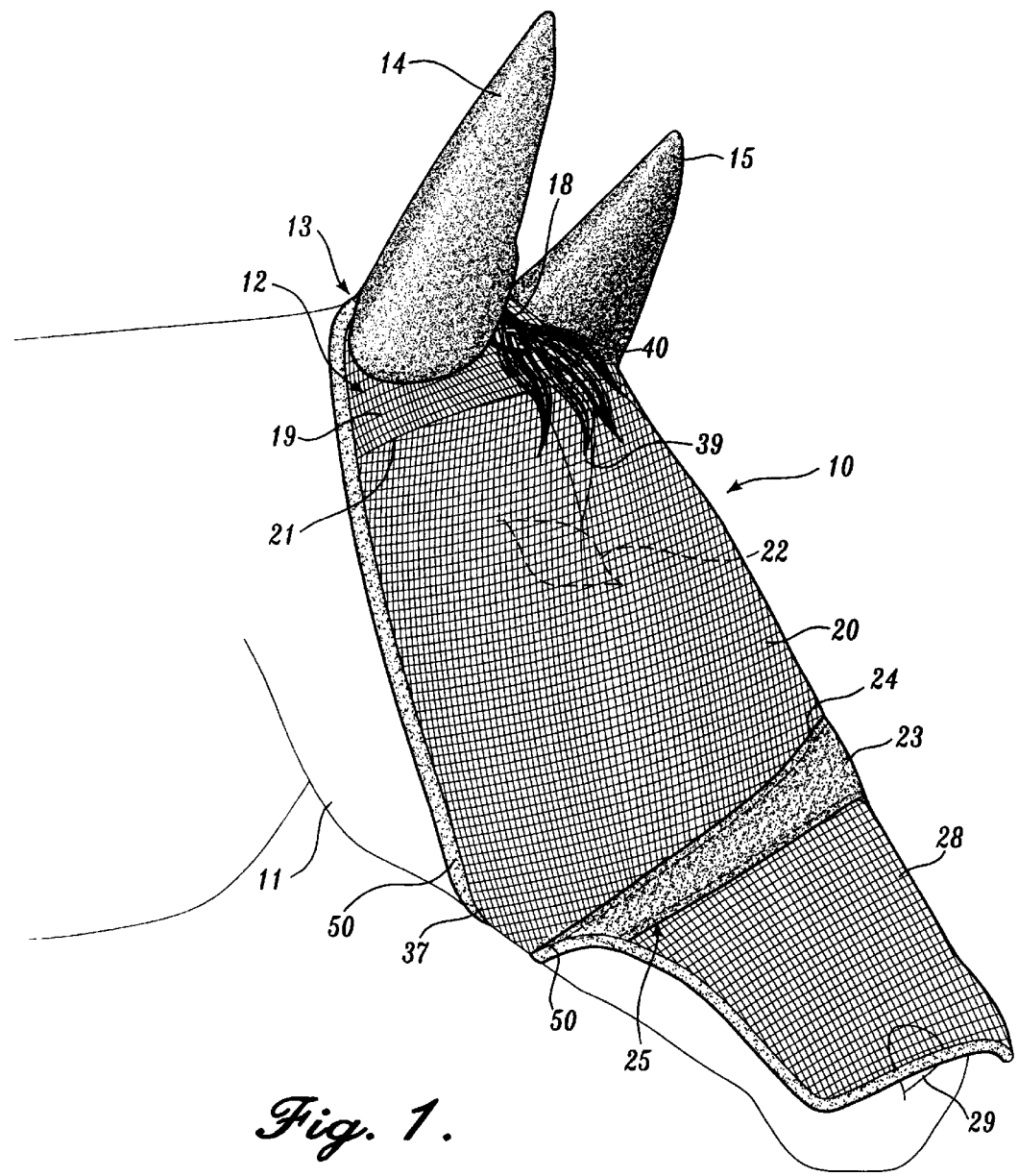
FIG. 1 is a side elevational view of a horse mask provided in accordance with a preferred embodiment of the present invention, illustrated in use on a horse.
Figure 2:
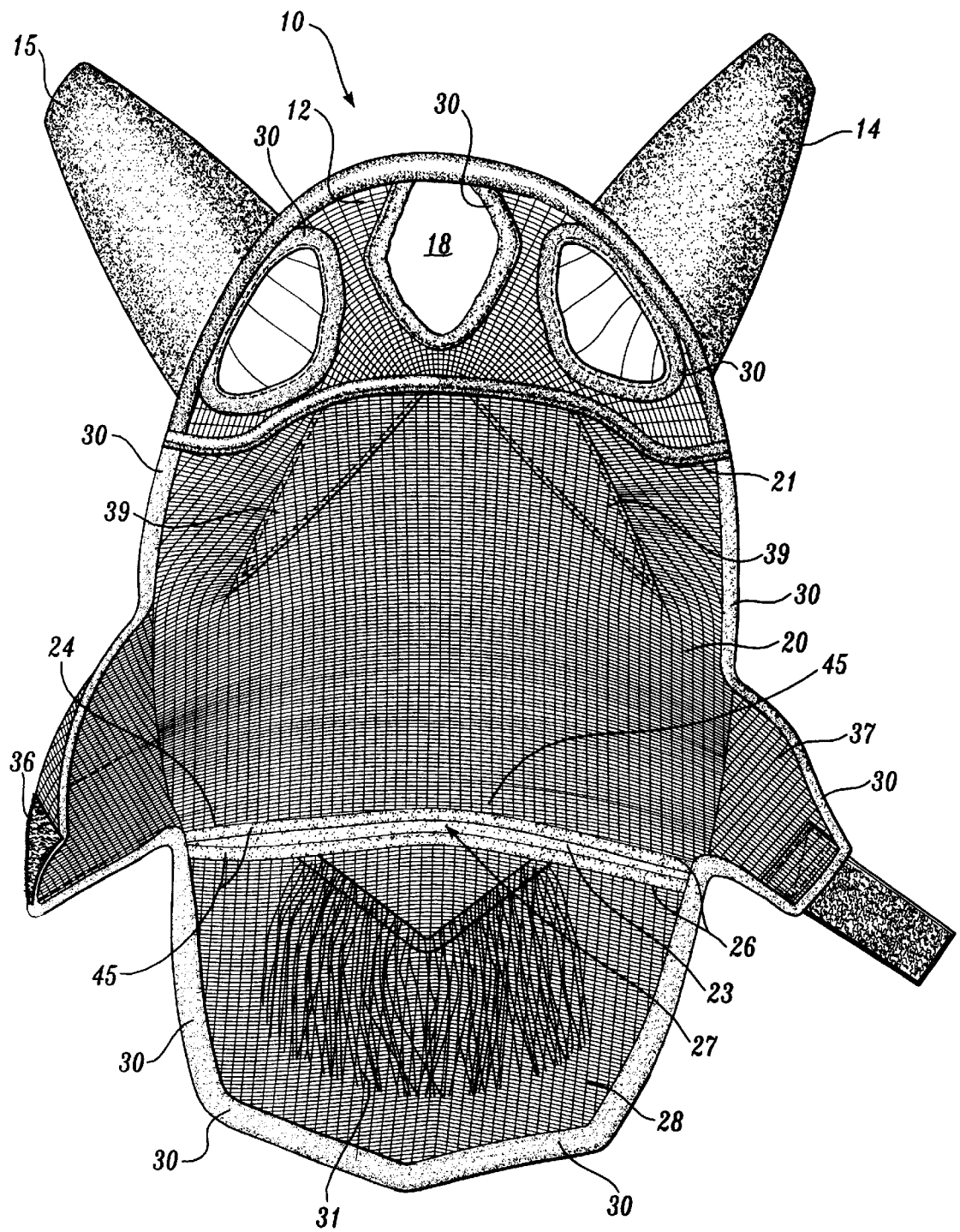
FIG. 2 is a rear plan view of the mask of FIG. 1.

A protective horse mask provided in accordance with a preferred embodiment of the present invention is illustrated in FIGS. 1 and 2. As best seen in FIG. 1, the protective mask 10 comprises a cap region 12 that is shaped to conform to a top region 13 of a horse's head 11. Although the cap may be made of a variety of materials, in a preferred embodiment, the cap is made of a mesh material. Although a variety of the mesh materials may be used, in a preferred embodiment, Phifertex™, manufactured by Phifer Wire Company of Tuscaloosa, Okla. is used. Alternatively, a fabric that will wick moisture away from the horse is used, for example, Wickaway™, manufactured by Milliken Corporation. As noted above, the cap 12 is form fitted to the horse's head 11 to stabilize the mask 10 and minimize shifting of the mask. It will be understood that different sized masks 10 may be made to conform to different sizes of horses, using average statistics of size for different types and ages of horses.

The cap 12 is provided with a first sleeve 14 and a second sleeve 15 formed integral to the cap and spaced laterally from each other. The first and second sleeves 14, 15 are formed to receive the first and second ears 16, 17 of the horse, respectively. The sleeves 14, 15 are preferably made of a soft material that will wick moisture away from the horse, for example, Wickaway™, described above. An opening 18 is provided in the cap 12 between the first sleeve 14 and second sleeve 15 to allow a forelock 40 to extend therethrough to rest on an outer surface 19 of the cap 12 and mask 10. By allowing the forelock 40 of the horse to extend through the cap 12, irritation to the horse is reduced.

A face panel 20 is coupled to a bottom edge 21 of cap 12. In a preferred embodiment, the face panel 20 is sewn to the cap. The face panel 20 has a sufficient length and width to extend downward from the cap to substantially cover eyes 22 of the horse. Although the face panel may be made of a variety of materials, in a preferred embodiment, the face panel 20 is made of a mesh material to allow ventilation and visibility through the mask. Although a variety of the mesh materials may be used, in a preferred embodiment, Phifertex™, manufactured by Phifer Wire Company of Tuscaloosa, Okla. is used. To keep the face panel 20 away from the eyes 22 of the horse, a dart 39 is formed in the mesh face panel 20 above each of the eyes 22.

In a preferred embodiment, as further illustrated in FIGS. 1–2, a nosepiece 23 is coupled to a bottom edge 24 of face panel 20. The nosepiece 23 extends laterally and has a sufficient width to span a bridge 25 of a horse's nose. Although the nosepiece may be made of a variety of materials, in a preferred embodiment, it is made from a soft material that wicks moisture away from the horse, such as fleece material described below or a material similar to the material forming the sleeves 14, 15. A seal 26 is provided on an inner surface 27 of nosepiece 23. When the mask 10 is positioned on a horse's head, the seal 26 rests on the bridge 25 of the horse's nose to substantially prevent insects from passing under the nosepiece 23. Although the seal 26 may be formed of a variety of materials, in a preferred embodiment, the seal is formed by coupling a first quantity of fleece material 45 to the inner surface 27 of the nosepiece 23, and preferably to an inner perimeter of the nosepiece 23. The fleece material preferably has a low nap, and has a two-sided pile formed of a material to wick moisture away from the horse, for example, polyester. Although a variety of fleece material may be used, in a preferred embodiment, Polarfleece® manufactured by Malden, or a comparable material, is used. The use of a material with wicking properties keeps the horse cooler, and therefore more comfortable. Furthermore, using a fleece material with a low nap minimizes the likelihood that burs and stickers will attach to the fleece material, again minimizing irritation to the horse.

As further illustrated in FIGS. 1–2, a nose panel 28 is coupled to the nosepiece 23 and extends downward to a point adjacent the nostrils 29 of a horse. In a preferred embodiment, the nosepiece 23 and nose panel 28 are sewn together and to the face panel 20 to form an integral mask. The nosepiece 23 provides a soft contact point between the mask and horse, and angles the nose panel away from the horse's nose to substantially prevent the nose panel 28 from resting on the horse's nostrils or muzzle. The nose panel 28 is preferably made of the same type of mesh material from which the face panel 20 is formed, and acts to shield the horse's face from sunlight and insects. To further increase the comfort of the mask 10, a quantity of fleece material 30 similar to that described above is coupled to an inner surface of the nose panel 28 and of the face panel 20 along all edges of the face panel 20 and nose panel 28 which when in use, may contact the horse. Similarly, in a preferred embodiment, fleece material 30 is coupled to all other inner seams and edges of the mask that will contact the horse.

As best seen in FIG. 2, a plurality of fringe 31 are coupled to the inner surface 27 of the nosepiece 23 and have a sufficient length to extend downward from the nosepiece 23 along the bridge 25 of the horse's nose. The fringe 31, however, stops short of the nostrils 29 of the horse, to avoid irritating the horse. The placement of the fringe 31, together with movement of the fringe 31 caused by movement of the horse's head, will further prevent flies and insects from passing under the nosepiece to the eye region of the horse, and will also dissuade flies and insects from landing on the horse's nose.

Figure 3:
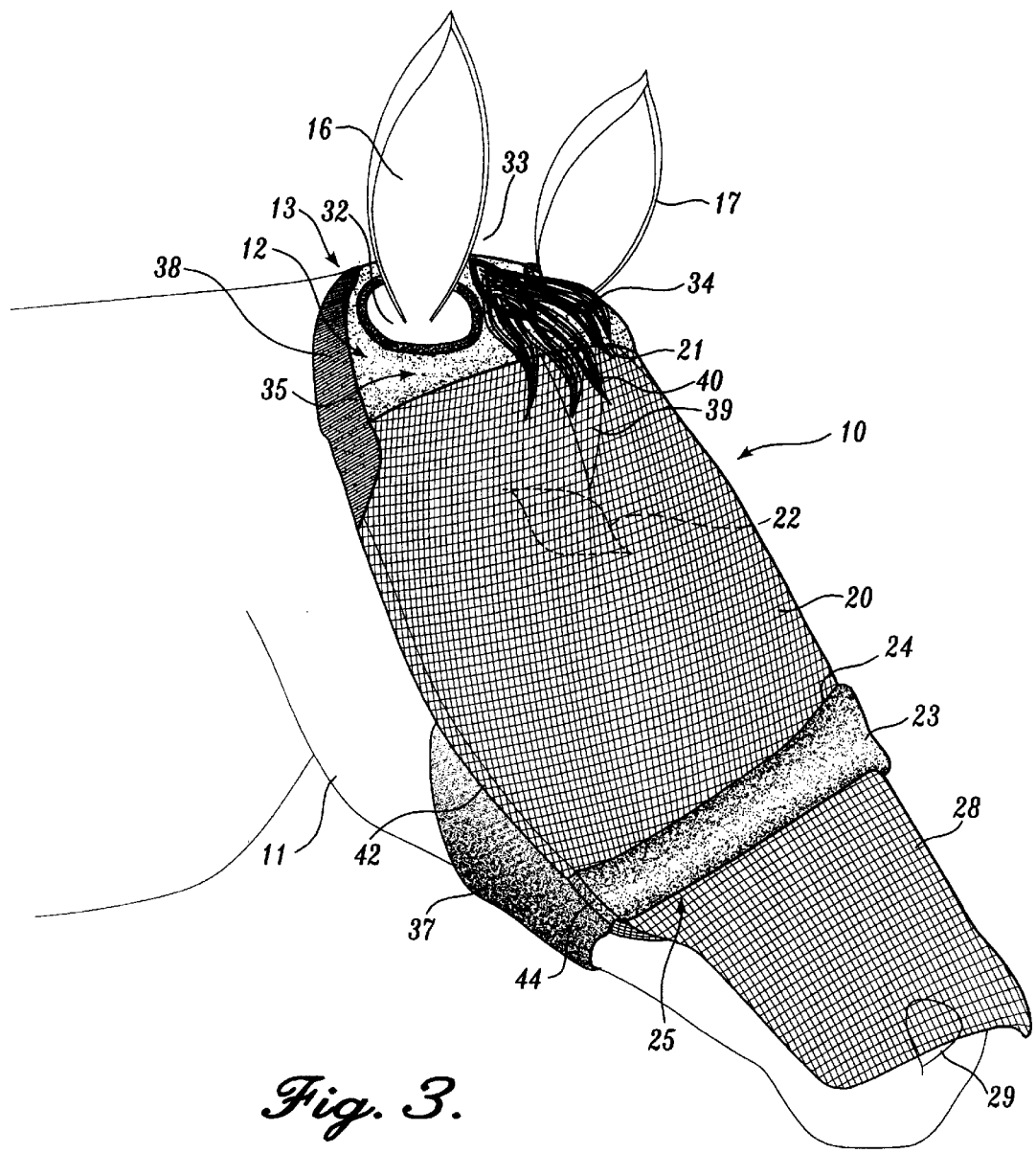
FIG. 3 is a side elevational view of a horse mask provided in accordance with an alternative embodiment of the present invention.
Figure 4:
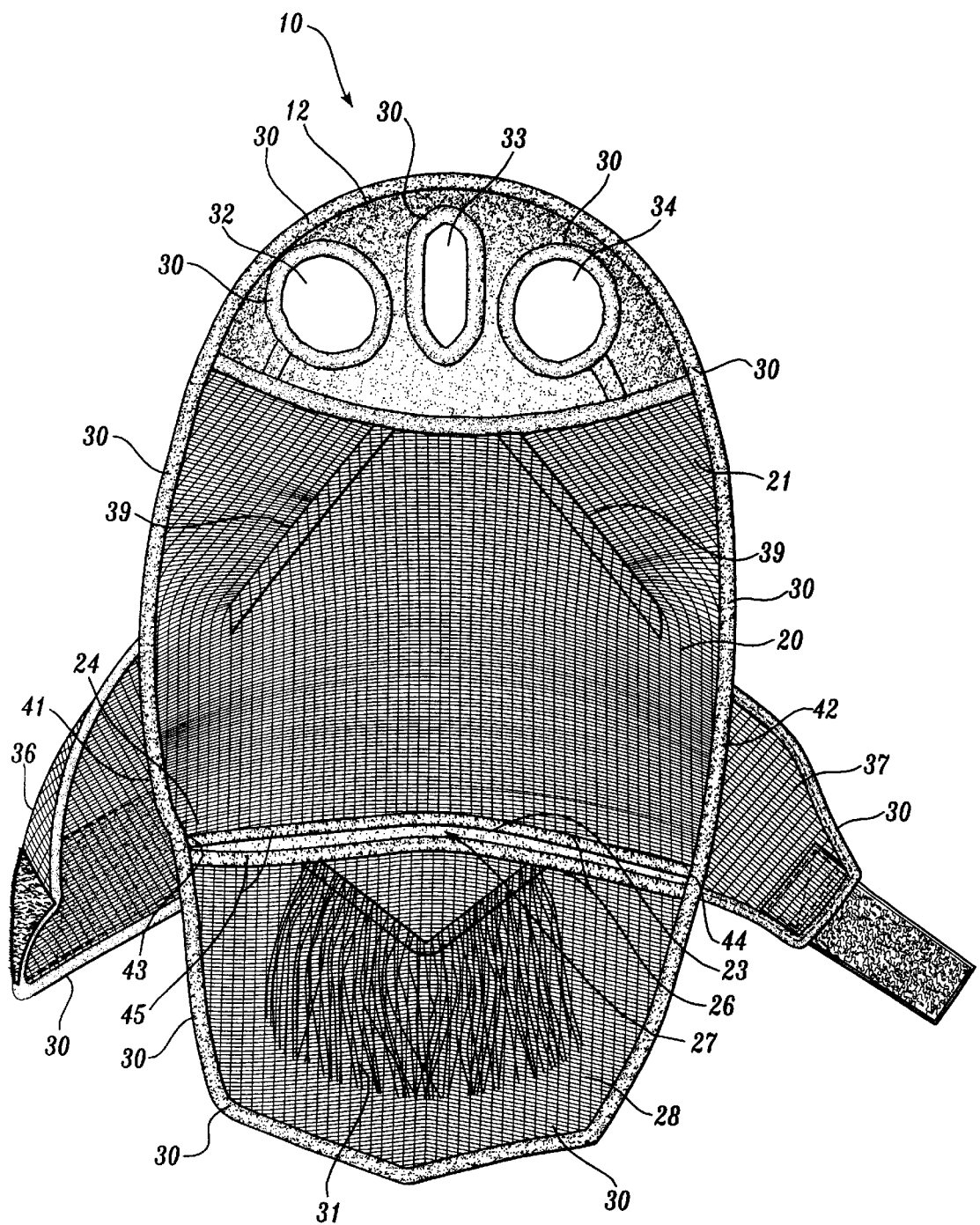
FIG. 4 is a rear plan view of the mask shown in FIG. 3.
Figure 5:
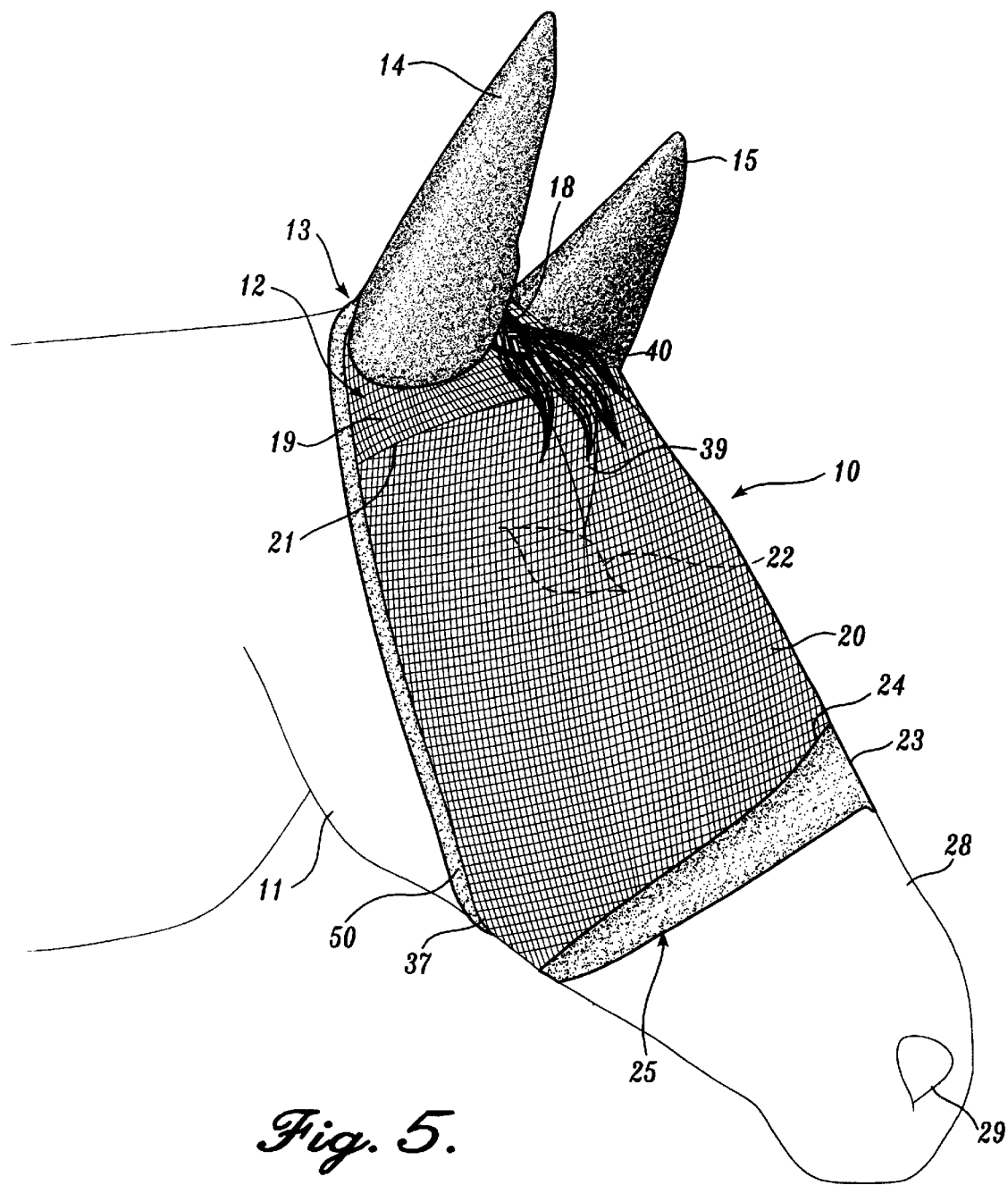
FIG. 5 is a side elevational view of a horse mask provided in accordance with an alternative embodiment of the present invention.
Figure 6:
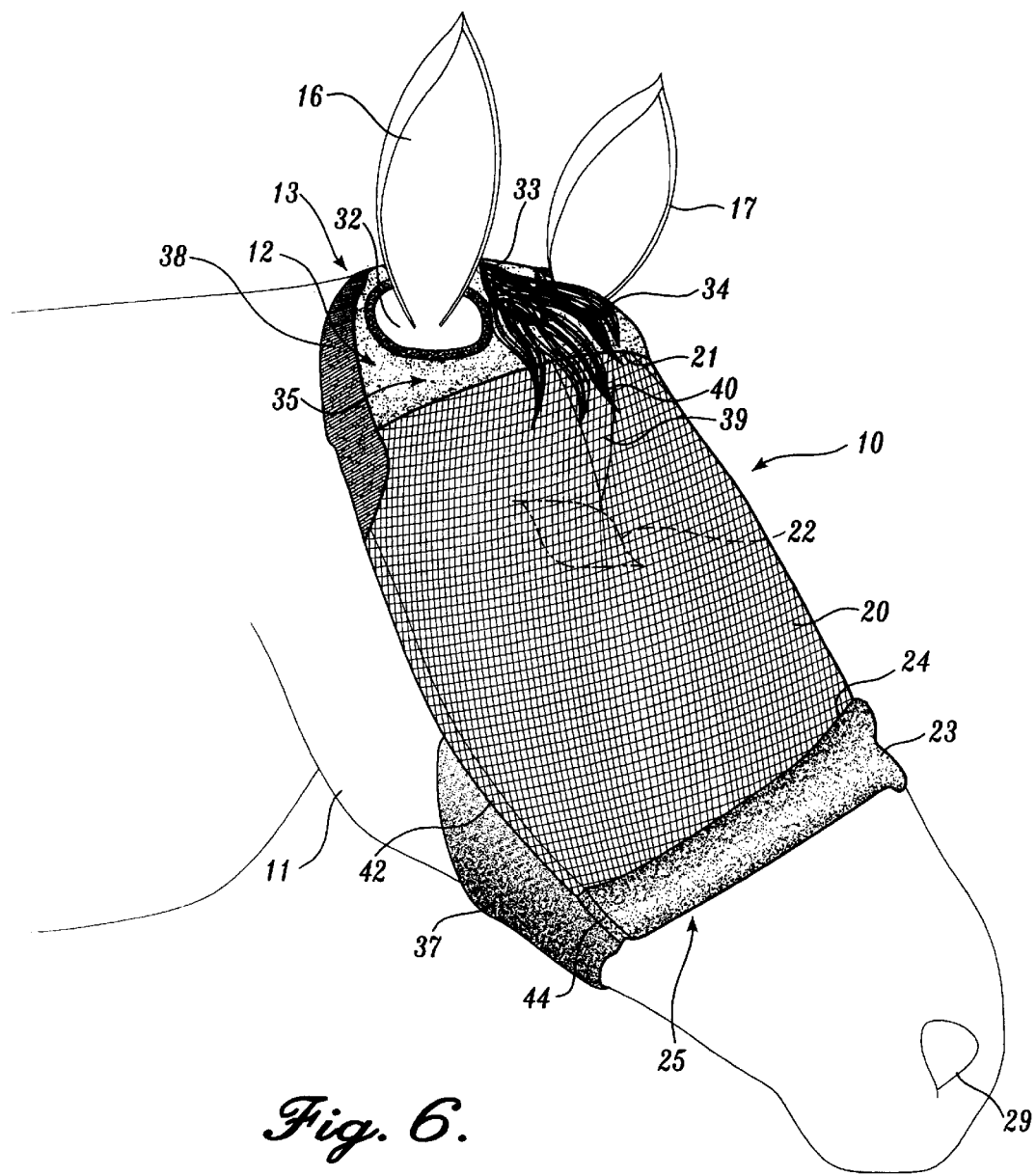
FIG. 6 is a side elevational view of a horse mask provided in accordance with yet another alternative embodiment of the present invention.

To secure the mask 10 to the horse's head 11, a first strap 36 and a second strap 37 are releasably securable together under the horse's head. In a preferred embodiment, as illustrated in FIGS. 1–2 and 5, the first and second straps 36, 37 are formed integral to the mesh face panel 20. A quantity of fleece 50 extends along a perimeter of the face panel 20 and perimeter of nose panel 28 along outer edges of the straps 36, 37. In an alternative embodiment, as illustrated in FIGS. 3–4 and 6, the first strap 36 is coupled to a first edge 41 of the face panel 20, and the second strap 37 is coupled to a second edge 42 of the face panel 20. The first and second straps 36, 37 may also extend along the outer edges 43, 44 of the nosepiece 23 that are adjacent the edges 41, 42 of the face panel 20, respectively. As noted above, the first and second straps 36, 37 are releasably securable together under the horse's head. Although a variety of materials and fasteners may be used, in a preferred embodiment, the first and second straps are made of mesh or of a soft material that will wick moisture away from the horse, and are releasably securable together using Velcro® or a similar type hook and loop fastener. As noted above and as seen in FIGS. 2 and 4, fleece material 30 is coupled to an inner perimeter of each of the straps to increase the comfort of use.

In an alternative embodiment, as illustrated in FIGS. 3 and 4, an upper region 35 of cap 12 is provided with a first opening 32, second opening 33, and third opening 34 spaced laterally across the upper region 35 of the cap. The first opening 32 is formed to allow a first ear 16 of the horse to extend therethrough, the second opening is formed to allow a forelock 40 of the horse to extend therethrough, and the third opening 34 is formed to allow a second ear 17 of the horse to extend therethrough. A quantity of fleece material 30 is provided along the perimeter of each of the first, second and third openings. To increase the stability and placement of the mask on the horse's head, a band 38 is attached to and extends from a first edge of the face panel 20, around the cap 12 behind the openings for the ears and forelock, and to the opposite side of the face panel. Although the band 38 may be made of a variety of materials, in a preferred embodiment, it is made of nylon. Such a band may also be used on the other embodiments described herein to increase the strength and stability of the masks. Alternatively, fleece material 50 extends around the perimeter of the cap, as shown in FIGS. 1 and 2. The remaining features of the mask illustrated in FIGS. 3 and 4, for example the face panel, nosepiece, and nose panel, are identical to those described above with respect to FIGS. 1 and 2, and therefore are not discussed in detail.

As illustrated in FIGS. 5 and 6, the two masks illustrated in FIGS. 1–4 may also be provided without the nose panel 28, in accordance with alternative embodiments of the present invention. The remaining features of the mask illustrated in FIG. 5 are identical to those described above with respect to FIGS. 1–2, and the remaining features of the mask illustrated in FIG. 6 are identical to those described above with respect to FIGS. 3–4.

From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

The embodiments of the invention in which an exclusive property or privilege is claimed are defined as follows:

1. A protective mask for a horse comprising:
a cap formed of a first quantity of material shaped to conform to a top region of a horse's head the cap having a first sleeve and a second sleeve spaced laterally from each other, each sleeve being formed to receive one ear of the horse, the cap further having an opening provided therein between the first and second sleeves to allow a forelock of the horse to extend therethrough to an outer surface of the cap, and a face panel formed of a second quantity of material coupled to a bottom edge of the cap and extending downward to substantially cover eyes of the horse.

2. A protective mask for a horse comprising:
(a) a cap shaped to conform to a top region of a horse's head and having a first sleeve and a second sleeve spaced laterally from each other, each sleeve being formed to receive one ear of the horse, the cap further having an opening provided therein between the first and second sleeves to allow a forelock of the horse to extend therethrough to an outer surface of the cap;
(b) a face panel coupled to a bottom edge of the cap and extending downward to substantially cover eyes of the horse;
(c) a nosepiece coupled to a bottom edge of the face panel and extending laterally to span a bridge of the horse's nose;
(d) a seal provided on an inner surface of the nosepiece resting on the bridge of the horse's nose to substantially prevent insects from passing under the nosepiece; and
(e) a nose panel coupled to the nosepiece and extending downward to a point adjacent nostrils of the horse.

3. The protective mask according to claim 2, wherein the seal is a first quantity of fleece material and a second quantity of fleece material is coupled to an inner surface of the face panel and of the nose panel extending along all edges of the face panel and nose panel which in use may contact the horse.

4. The protective mask according to claim 2, wherein a plurality of fringe are coupled to the inner surface of the nosepiece and have a length sufficient to extend downward along the bridge of the horse's nose.

5. The protective mask according to claim 2, further comprising a first strap coupled to a first edge of the face panel and a second strap coupled to a second edge of the face panel, the first and second straps being releasably securable together under the horse's head.

6. The protective mask according to claim 1, further comprising a band attached to and extending from a first edge of the face panel, around the cap behind the first and second sleeves and opening, to a second edge of the face panel.

7. The protective mask according to claim 1, further comprising a first strap coupled to a first edge of the face panel and a second strap coupled to a second edge of the face panel, the first and second straps being releasably securable together under the horse's head.

8. A protective mask for a horse comprising:
a cap formed of a first quantity of material shaped to conform to a top region of the horse's head, and having first, second, an third openings spaced laterally across an upper region of the cap, the first opening being formed to allow a first ear of the horse to extend therethrouqh, the second opening being formed to allow a forelock of the horse to extend therethrough, and the third opening being formed to allow a second ear of the horse to extend therethrough, and a face panel formed of a second quantity of material coupled to a bottom edge of the cap and extending downward to substantially cover eyes of the horse.

9. A protective mask for a horse comprising:
(a) a cap shaped to conform to a top region of the horse's head, and having first, second, and third openings spaced laterally across an upper region of the cap, the first opening being formed to allow a first ear of the horse to extend therethrough, the second opening being formed to allow a forelock of the horse to extend therethrough, and the third opening being formed to allow a second ear of the horse to extend therethrough;
(b) a face panel coupled to a bottom edge of the cap and extending downward to substantially cover eyes of the horse;
(c) a nosepiece coupled to a bottom edge of the face panel and extending laterally to span a bridge of the horse's nose;
(d) a seal provided on an inner surface of the nosepiece resting on the bridge of the horse's nose to substantially prevent insects from passing under the nosepiece; and
(e) a nose panel coupled to the nosepiece and extending downward to a point adjacent nostrils of the horse.

10. The protective mask according to claim 9, further comprising a first strap coupled to a first edge of the face panel and a second strap coupled to a second edge of the face panel, the first and second straps being releasably securable together under the horse's head.

11. The protective mask according to claim 9, wherein the seal is a first quantity of fleece material and a second quantity of fleece material is coupled to an inner surface of the face panel and of the nose panel extending along all edges of the face panel and nose panel which in use may contact the horse.

12. The protective mask according to claim 9, wherein a plurality of fringe are coupled to the inner surface of the nosepiece and have a length sufficient to extend downward along the bridge of the horse's nose.

13. The protective mask according to claim 8, further comprising a band attached to and extending from a first edge of the face panel, around the cap behind the first, second, and third openings, to a second edge of the face panel.

14. The protective mask according to claim 8, further comprising a first strap coupled to a first edge of the face panel and a second strap coupled to a second edge of the face panel, the first and second straps being releasably securable together under the horse's head.

15. A protective mask for a horse comprising:
a face panel having a width sufficient to extend laterally across both eyes of a horse and having a length sufficient to extend longitudinally across both eyes of a horse, the face panel being securable to a horse's head;
a nosepiece coupled to a bottom edge of the face panel and extending laterally to span a bridge of the horse's nose, a seal being provided on an inner surface of the nosepiece resting on the bridge of the horse's nose to substantially prevent insects from passing under the nosepiece; and
a nose panel coupled to the nosepiece and extending downward to a point adjacent nostrils of the horse.

16. The protective mask according to claim 15, further comprising a first strap coupled to a first edge of the face panel and a second strap coupled to a second edge of the face panel, the first and second straps being releasably securable together under the horse's head.

17. The protective mask according to claim 15, wherein the seal is a first quantity of fleece material and a second quantity of fleece material is coupled to an inner surface of the face panel and of the nose panel extending along all edges of the face panel and nose panel which in use may contact the horse.

18. The protective mask according to claim 15, wherein a plurality of fringe are coupled to the inner surface of the nosepiece and have a length sufficient to extend downward along the bridge of the horse's nose.

* * * * *

UNITED STATES PATENT AND TRADEMARK OFFICE
CERTIFICATE OF CORRECTION

PATENT NO. : 6,128,891
DATED : October 10, 2000
INVENTOR(S) : R.L. McMahon

It is certified that error appears in the above-identified patent and that said Letters Patent is hereby corrected as shown below:

| COLUMN | LINE | |
|---|---|---|
| 5 (Claim 1, | 5 line 3) | "head the" should read --head, the-- |
| 5 (Claim 8, | 63 line 4) | "an third" should read --and third-- |
| 5 (Claim 8, | 66 line 7) | "therethrouqh" should read --therethrough-- |
| 5 (Claim 8, | 67 line 8) | "extend the" should read --extend-- |

Signed and Sealed this

Twenty-second Day of May, 2001

Attest:

NICHOLAS P. GODICI

Attesting Officer

Acting Director of the United States Patent and Trademark Office